Dec. 20, 1966  P. H. ROGERS  3,292,755
VARIABLE FLUID SPEED TRANSMISSION
AND REVERSING ATTACHMENT

Filed July 6, 1964  3 Sheets-Sheet 1

INVENTOR.
PATRICK H. ROGERS
BY *Robert W Duckworth*
ROBERT W. DUCKWORTH
ATTORNEY Dec. 20, 1966 P. H. ROGERS 3,292,755
VARIABLE FLUID SPEED TRANSMISSION
AND REVERSING ATTACHMENT
Filed July 6, 1964 3 Sheets-Sheet 2

INVENTOR.
PATRICK H. ROGERS
BY Robert W Duckworth
ROBERT W. DUCKWORTH
ATTORNEY

United States Patent Office 3,292,755
Patented Dec. 20, 1966

3,292,755
VARIABLE FLUID SPEED TRANSMISSION AND
REVERSING ATTACHMENT
Patrick H. Rogers, 1923 Beecher St.,
Orlando, Fla. 32808
Filed July 6, 1964, Ser. No. 380,401
3 Claims. (Cl. 192—58)

This invention pertains to a new and useful article of manufacture.

More particularly, this invention pertains to variable speed transmission.

It is the primary object of this invention to transmit the rotary motion of a driving shaft to a driven shaft at variable speeds.

It is another object of this invention to provide a variable speed transmission in which there are no centrifugal force or turbine principles involved.

It is another object of this invention to provide as a diversified modification a reversing attachment for the basic variable speed transmission system.

It is another object of this invention to provide a transmission system wherein the speed of the driven shaft is regulated by controlling the volume of transmission fluid acting thereon.

These and other objects of this invention will become more apparent from a study of the specification and by referring to the accompanying drawings in which.

Figure 1:
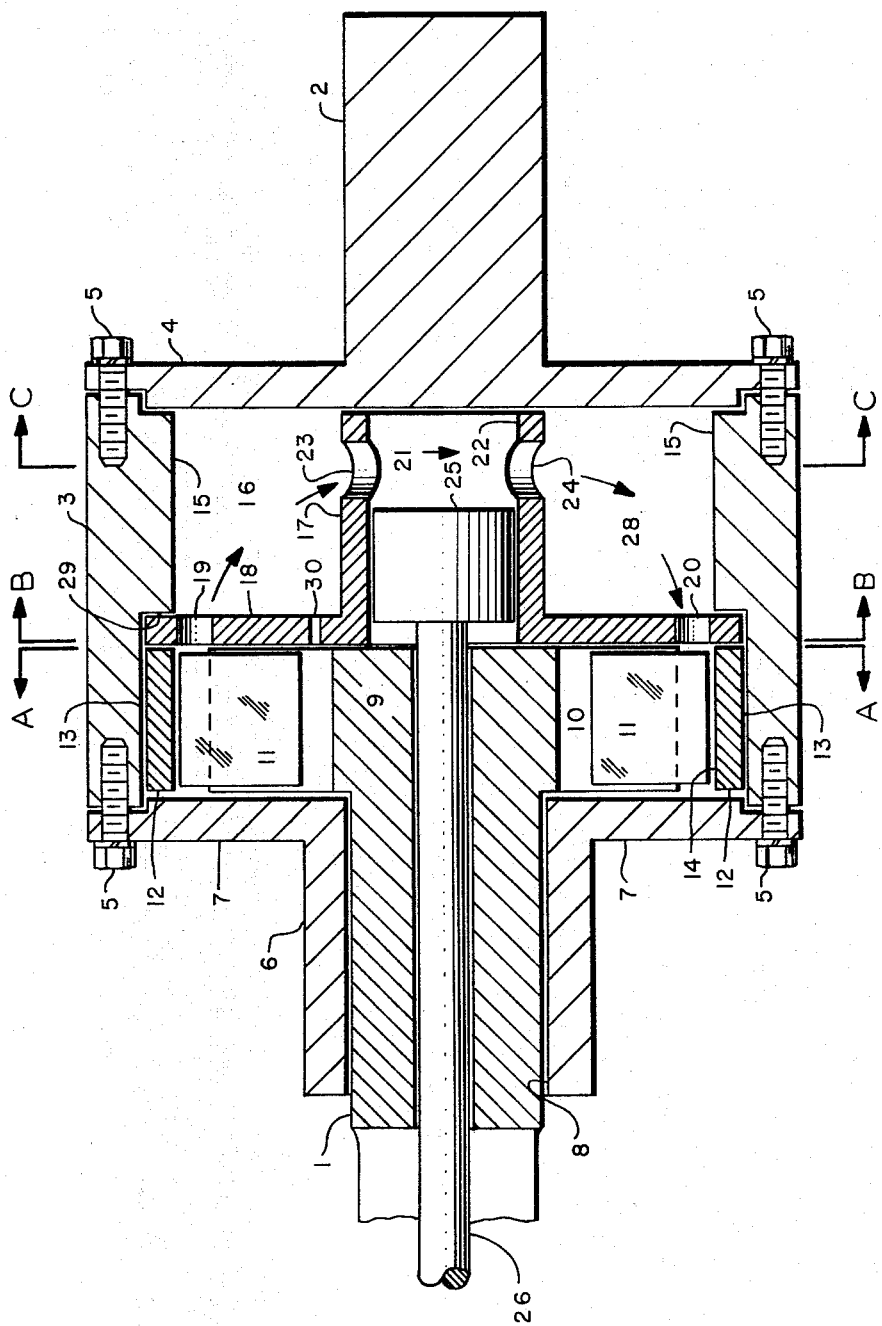
FIGURE 1 is a side sectional view of the basic invention showing the major components.

Referring more particularly now to FIGURE 1 will be seen the invention comprising a driving shaft 1 and a driven shaft 2 contained at either end respectively of the transmission housing 3. The driven shaft 2 is provided with a flange body 4 which is fixed to the transmission housing body 3 by means of bolts 5 and acts as a seal for the driven end of the transmission housing 3. The opposite end of transmission housing body 3 is sealed by means of a driving shaft housing 6 which shaft housing 6 is provided with flange means which acts as an end plate body 7 to seal the driving end of the transmission housing 3. End plate body flange 7 and thereby driving shaft housing 6 are fixed to the housing body by bolts 5. The driving shaft housing 6 has a circular bore 8 running through its center and is adapted to support, for rotation, the driving shaft 1. Driving shaft 1 has an impeller body 9 which comprises a plurality of radially extending recesses 10 in each of which rests a pump blade 11 adapted to engage an eccentric body 12. Impeller body 9, pump blades 11 and eccentric body 12 all are contained within a first bore 13 of transmission housing 3. It should be noted that the inside bore surface 14 of eccentric body 12 is eccentric with respect to the center axis of eccentric body 12. Transmission housing 3 contains a second smaller bore 15 which provides a fluid transmission chamber 16 and an abutment 29. Contained in the transmission chamber 16 is a control valve 17 comprising a control valve plate 18 on which plate is situated a discharge port 19 and an oppositely arranged suction port 20. The control valve plate 18 is contained in the transmission housing first bore 13 along with the impeller body 9, pump blades 11 and the eccentric body 12. Control valve 17 has a control valve chamber 21 therein effected by a control valve circular bore 22 extending therethrough. Control valve 17 further has a first control valve port 23 and a second control valve port 24 in the side walls thereof and located so that first control valve port 23 adjoins a fluid transmission chamber 16 and second control valve port 24 adjoins a fluid transmission chamber 28. Contained within the control valve chamber 21 is a fluid control valve plunger 25 adapted to be actuated longitudinally by control valve linkage 26 to effect a partial or complete closing or opening of the control valve ports 23, 24.

Thus it can be seen that when control valve ports 23, 24 are open and the shaft 1 is driven by external force, the pump blades 11 will force the transmission fluid out of discharge port 19 and in the direction of the arrows into the first transmission chamber 16 through ports 23, 24 and into second transmission chamber 28 back into suction port 20 wherein shaft 1 will turn under the external influence but driven shaft 2, transmission housing 3, control valve 17 and eccentric body 12 will not rotate. When fluid control valve plunger 25 is actuated by means of linkage 26 to close ports 23, 24 such actuation restricts or stops the flow of fluid and pressure is built up by and against the blades 11 and in turn causes the driven shaft 2, housing 3 and end plate 7 to rotate. When ports 23, 24 are completely closed the ratio between the driving shaft 1 and the driven shaft 2 will be 1 to 1, provided there is no leakage. Reduced ratio between the driving shaft 1 and the driven shaft 2 may be effected by allowing increased amounts of fluid to flow through the control valve 17.

Shown dotted is a longitudinally extending chamber divider 27 which is fixed to control valve 17 and controls the fluid to force the fluid to flow into and out of ports 23, 24 and not to bypass the said ports 23, 24.

As described, if the fluid will flow in the direction of the arrows then obviously, when the rotation of driving shaft 1 is reversed the fluid will flow in a direction opposite to the arrows shown in FIGURE 1. A passage 30 is provided in control valve plate 18 whereby fluid may pass from the first transmission chamber 16 to pump blades 11.

Figure 2:
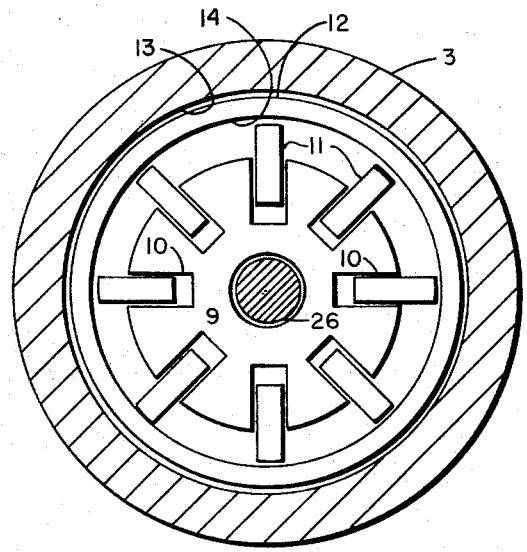
FIGURE 2 is a section taken along section line A—A of FIGURE 1.

FIGURE 2 taken along line A—A of FIGURE 1 shows the transmission housing 3 with first bore 13 in which is situated impeller body 9 in which there are a plurality of radially extending recesses 10 in each of which is a pump blade 11. Impeller body 9 and blades 11 are nested within the inside bore 14 of eccentric body 12 and eccentric body 12 is contained within the first bore 13 of transmission housing 3. Control valve linkage 26 is shown in place at the center of impeller body 9. Pump blades 11 may be kept in engagement with the inside bore surface 14 of eccentric body 12 by means of fluid under pressure being applied to the side of the pump blade facing the axes. Fluid under pressure may enter through passage 30 or 20 indicated in FIGS. 1 and 3.

Figure 3:
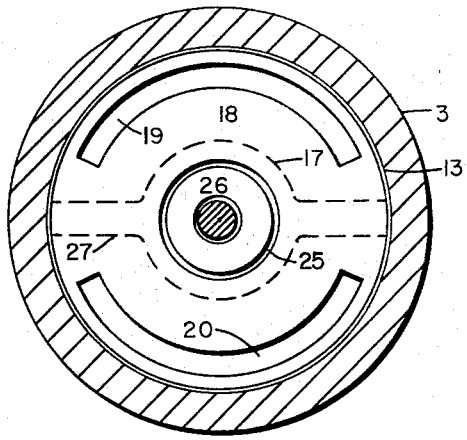
FIGURE 3 is a section taken along section line B—B of FIGURE 1.

FIGURE 3 taken along line B—B of FIGURE 1 shows the transmission housing 3 having a first internal bore 13 in which control valve plate 18 is situated. Control valve plate 18 has generally crescent shaped discharge port 19 and suction port 20. It should be noted that ports 19, 20 are of non-uniform cross section so as to effect the fluid pressure necessary to actuate this transmission. Control valve 17 and chamber divider 27 are shown dotted but in their proper place. Control valve plunger 25 and its control valve linkage 26 are likewise shown in place. Passage 30 is shown in location in control valve plate 18.

Figure 4:
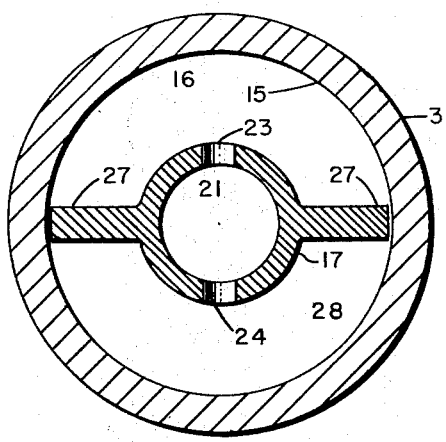
FIGURE 4 is a section taken along section line C—C of FIGURE 1.

FIGURE 4 taken along line C—C of FIGURE 1 shows housing 3 with a second smaller bore 15 in which is situated control valve 17, its chamber divider 27, discharge chamber 16, suction chamber 28 and ports 23, 24 connecting said chamber 16, 28 through control valve chamber 21.

Figure 5:
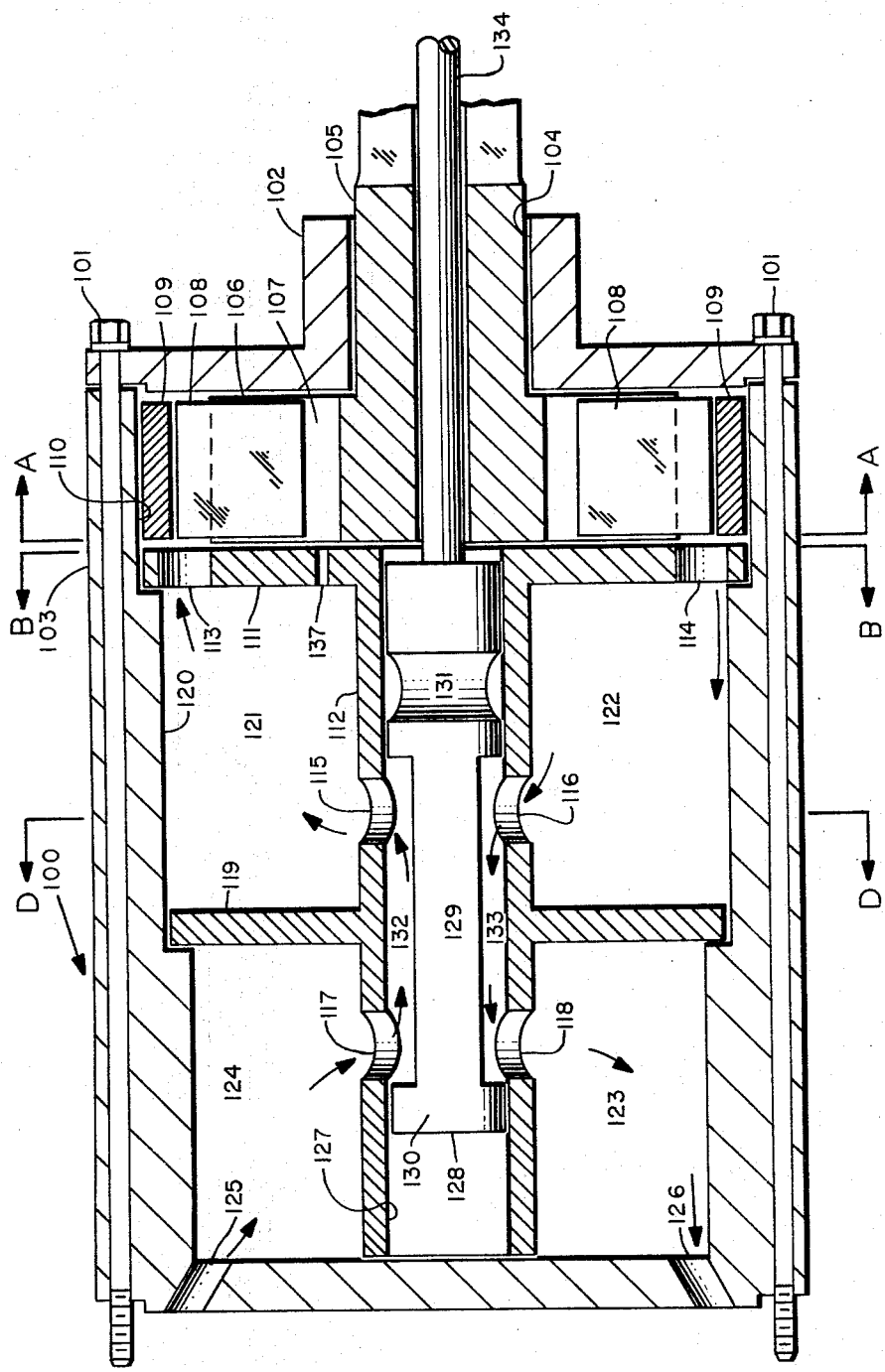
FIGURE 5 is a side section of the invention with the reversing attachment fixed thereto.

FIGURE 5 is reversing attachment 100 for the modification shown in FIGURES 1–4 and is utilized by removing from FIGURE 1 the driven shaft 2 and being substituted in the place thereof. Reversing attachment 100 is fixed to housing 3 of FIGURE 1 by means of suitable bolts 101 which bolts 101 also fix working shaft housing 102 to attachment housing 103. Working shaft housing 102 has an internal bore 104 in which is placed a working shaft 105 which is adapted for rotation in said bore 104. Working shaft 105 has an impeller body 106 in which is contained a plurality of recesses 107 and in each of which recesses is contained a blade 108. The impeller body 106 and blades 108 are adapted to rotate inside an eccentric body 109 and are contained within a first housing bore 110. Also contained in said first housing bore 110 is a valve plate 111 which is a flange of control valve housing 112. Valve plate 111 is provided with an inlet port 113 and an outlet port 114. Control valve housing 112 further provides a plurality of second upper and lower reversing ports 115, 116 respectively and a plurality of first upper and lower reversing ports 117, 118 respectively which are supported by a chamber divider plate 119 which abuts the bottom of a second housing bore 120. There is thereby effected a plurality of seperate chambers which are upper intake chamber 124, upper intake chamber 121, lower return chamber 122 and lower return chamber 123. The upper chambers 124, 121 are divided by circular chamber divider plate 119 and a second chamber divider 135. The same is true for the lower chambers 122, 123. Connecting to first upper chamber 124 is an inlet port 125 and connecting to lower return chamber 123 is an exhaust port 126. Control valve housing 112 has a central bore 127 and centered therein is a second control valve plunger 128 which has a first longitudinally extending reduced section 129 which effects a sealing end 130 and a second circumferentially extending by-pass valve 131. The reduced section 129 and the central bore 127 effects a plunger upper chamber 132 and a plunger lower chamber 133. The valve plunger 128 is adapted to be reciprocated as desired by actuating linkage 134.

Figure 6:
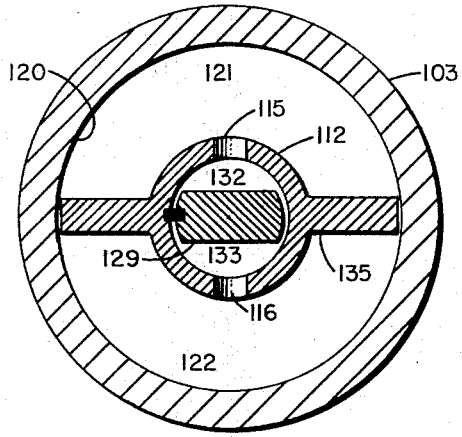
FIGURE 6 is a sectional view taken along section line D—D of FIGURE 5.

FIGURE 6 taken along line D—D of FIGURE 5 shows the attachment housing 103 having second housing bore 120. Situated in bore 120 is the control valve housing 112 and the radially extending second chamber divider 135 which effects the upper intake chamber 121 and the lower return chamber 122. Transmission fluid is able to enter plunger upper chamber 132 to exhaust through second upper reversing port 115 and after doing work to reenter second lower reversing port 116 and into plunger lower chamber 133. Reduced section 129 of the control valve plunger is constrained from rotating with respect to valve housing 112 by key means 136.

The operation of the invention is as follows:

FIGURES 1–4. Rotary power is applied to the driving shaft 1 whereby impeller 9 is put in rotary motion. Fluid control valve plunger 25 is positioned to open ports 23, 24 to allow fluid to circulate from discharge port 19 to first transmission chamber 16 then through first control valve port 23 to control valve chamber 21, through second control valve port 24 to second transmission chamber 28 through suction port 20. (If rotation of shaft 1 is reversed then the fluid flow is reversed.) At this position of the fluid control valve plunger 25 the driven shaft 2, the transmission housing 3, the flange body 4, the control valve plate 18, the end plate body 7, driving shaft housing 6, the eccentric body 12 are not in motion as the system is in the neutral position. When the fluid control valve plunger 25 is moved to partially or completely close off ports 23, 24 is will restrict the flow of transmission fluid and pressure is built up against the impeller-blade system which in turn forces the driven shaft 2 to turn as will the transmission housing 3 and driving shaft housing 6.

The operation of the reversing attachment of FIGURES 5 and 6 is as follows:

Remove the driven shaft 2 and its flange body 4 from the system shown in FIGURE 1 and attach by means of bolts 101 the device shown in FIGURE 5. The following elements will maintain a constant relationship—transmission housing 3 and control valve plate 18 (both of FIGURE 1), attachment housing 103, driven shaft housing 102, eccentric body 109, circular chamber divider plate 119 and the reduced section 129 of the second control valve plunger 128 (all of FIGURE 5). Now apply a braking device (not shown) to prevent the above noted FIGURE 5 and FIGURE 1 elements from rotating. Start the driving shaft 1 and the impeller body 9 (of FIGURE 1). Move the fluid control valve plunger 25 (FIGURE 1) to close ports 23, 24. Transmission fluid will then pass from the first transmission chamber 16 through supply port 125 (FIGURE 5) to upper supply chamber 124 through the first upper reversing port 117 to plunger upper chamber 132 through second upper reversing port 115 to upper supply chamber 121 through inlet port 113 to the blades 108 of impeller body 106 and to be returned through outlet port 114, the lower return chamber 122, the second lower reversing port 116, the plunger lower chamber 133, the first lower reversing port 118, the lower return chamber 123 then through the return port 126 (all of FIGURE 5) back into second transmission chamber 28 through suction port 20 to the impeller body 9 (all of FIGURE 1) thus driving working shaft 105 in a reversed rotation.

It should be noted that various sizes of pump and motor will produce rotation ratios in relation to their sizes.

By positioning the second control valve plunger 128 to line bypass valve means 131 with ports 115, 116 and releasing the braking device (not shown) will produce a neutral position whereby the working shaft 105 may rotate in either direction in relation to the entire unit.

By positioning the second control valve plunger 128 to close off ports 115, 116 thus preventing any flow of the fluid, the working shaft 105 becomes locked and will rotate with the rest of the unit. This position will be used when the working shaft is to rotate in the same direction as the driving shaft 1 (of FIGURE 1).

It is obvious that either right hand or left hand rotation may be readily applied to this unit with equal results. Also, either shaft may be driving or driven.

Having thus disclosed and described my invention, I claim:

1. A variable speed transmission comprising a driven shaft fixed to one end of a hollow cylindrical housing, the other end of said housing having fixed thereto a flanged driving shaft housing, a driving shaft supported by and adapted for rotation in said shaft housing, said driving shaft having an impeller portion extending in said cylindrical housing, said impeller portion comprising a plurality of radially extending recesses, each one of said plurality of recesses having a pump blade therein, an eccentric body inside said cylindrical housing, said blades adapted to engage the inner wall surface of said eccentric body, a control valve in said housing and adjacent said impeller, said control valve having a plate thereon, said plate providing a discharge port and a suction port, said control valve having a hollow cylindrical surface, said surface comprising a first control valve port and a second control valve port, a fluid control valve plunger in said hollow of said control valve to engage said control valve ports, means extending through said driving shaft for reciprocating said fluid control valve plunger, a first transmission chamber adjacent said first control valve port and a second transmission chamber adjacent said second control valve port and means for separating said chambers.

2. A reversing attachment for a variable speed transmission comprising a hollow cylindrical attachment housing, a working shaft housing fixed to one end of said attachment housing, the other end of said attachment housing providing an inlet port and an exhaust port, a working shaft supported by, and adapted for rotation in, said working shaft housing, said working shaft having an impeller body extending into said attachment housing, said impeller body having a plurality of radially extending recesses therein, each of said recesses having a blade therein, said blades adapted to rotate in and engage the inner surface of a cylindrical eccentric body, a control valve housing in said attachment housing, a cylindrical valve plate fixed to said control valve housing and having a exhaust port and an inlet port thereon, a second control valve plunger adapted to reciprocate in said control valve housing, said plunger having a longitudinally extending reduced portion and a circumferentially extending bypass valve, said control valve housing having a plurality of upper reversing ports and a plurality of lower reversing ports, an upper intake chamber adjacent one of said upper reversing ports, an upper supply chamber adjacent the other of said upper reversing ports, a lower intake chamber adjacent one of said lower reversing ports and a lower return chamber adjacent said other lower reversing port, said reduced section of said valve plunger providing a plunger upper chamber common to said plurality of upper reversing ports and a plunger lower chamber common to said lower reversing ports, and means for articulating said bypass valve common to said second upper reversing port and said second lower reversing port.

3. In combination, a variable speed transmission and a reversing attachment therefor; said variable speed transmission comprising a hollow cylindrical housing, a driven shaft fixed to one end of a hollow cylindrical housing, the other end of said housing having fixed thereto a flanged driving shaft housing, a driving shaft supported by and adapted for rotation in said shaft housing, said driving shaft having an impeller portion extending in said cylindrical housing, said impeller portion comprising a plurality of radially extending recesses, each one of said plurality of recesses having a pump blade therein, an eccentric body inside said cylindrical housing, said blades adapted to engage the inner wall surface of said eccentric body, a control valve in said housing and adjacent said impeller, said control valve having a plate thereon, said plate providing a discharge port and a suction port, said control valve having a hollow cylindrical surface, said surface comprising a first control valve port and a second control valve port, a fluid control valve plunger in said hollow of said control valve to engage said control valve ports, means extending through said driving shaft for reciprocating said fluid control valve plunger, a first transmission chamber adjacent said first control valve port and a second transmission chamber adjacent said second control valve port and means for separating said chambers; said reversing attachment comprising a hollow cylindrical attachment housing, a cylindrical eccentric body mounted within said attachment housing, a working shaft housing fixed to one end of said attachment housing, the other end of said attachment housing providing an inlet port and an exhaust port, a working shaft supported by, and adapted for rotation in, said working shaft housing, said working shaft having an impeller body extending into said attachment housing, said impeller body having a plurality of radially extending recesses thereon, each of said recesses having a blade therein, said blades adapted to rotate in and engage the inner surface of said cylindrical eccentric body, a control valve housing in said attachment housing, a cylindrical valve plate fixed to said control valve housing and having an exhaust port and an inlet port thereon, a second control valve plunger adapted to reciprocate in said control valve housing, said plunger having a longitudinally extending reduced portion and a circumferentially extending bypass valve, said control valve housing having a plurality of upper reversing ports and a plurality of lower reversing ports, an upper intake chamber adjacent one of said upper reversing ports, an upper supply chamber adjacent the other of said upper reversing ports, a lower intake chamber adjacent one of said lower reversing ports and a lower return chamber adjacent said other lower reversing port, said reduced section of said valve plunger providing a plunger upper chamber common to said plurality of upper reversing ports and a plunger lower chamber common to said lower reversing ports, and means for articulating said bypass valve common to said second upper reversing port and said second lower reversing port.

References Cited by the Examiner
UNITED STATES PATENTS

| 2,313,049 | 3/1943 | Cook | 192—58 |
| 2,581,172 | 1/1952 | Carson | 192—58 |
| 3,049,207 | 8/1962 | Maier | 192—58 |
| 3,058,557 | 10/1962 | Zierick | 192—58 |
| 3,184,022 | 5/1965 | Olson | 192—58 |

FRED C. MATTERN, Jr., *Primary Examiner.*

DON A. WAITE, DAVID J. WILLIAMOWSKY,
*Examiners.*

A. T. McKEON, *Assistant Examiner.*